Patented Mar. 3, 1942

2,275,075

UNITED STATES PATENT OFFICE 2,275,075

PROCESS FOR REFINING AND OBTAINING VALUABLE PRODUCTS FROM TALL OIL

Frederick H. Gayer and Charles E. Fawkes, Chicago, Ill., assignors to Continental Research Corporation, Chicago Heights, Ill., a corporation of Illinois No Drawing. Application October 18, 1937, Serial No. 169,655

5 Claims. (Cl. 260—97.5)

This invention relates to the refining and obtaining of valuable products from tall oil and in particular to the treatment of tall oil with hydrochloric acid to yield a refined tall oil of improved color and clarity, and at the same time recover and isolate therefrom minor quantities of valuable and useful constituents.

Many attempts have been made in the past to refine tall oil, a by-product of sulphate or kraft paper pulp manufacture, and a particularly rich source thereof is from coniferous woods originating in the southern part of the United States. Tall oil is obtained by acidification and other treatment of the black liquor soap which is salted out and rises to the surface of the black liquor on standing, and is composed preponderantly of higher fatty acids and resin acids which together make up about 80 to 90 per cent of its weight. The balance consists of coloring substances (oxidized resin acids) and unsaponifiable matter. The latter is composed of hydrocarbons and cyclic alcohols belonging to the group of phytosterols of which tall oil is an unusually rich source.

Our co-pending application No. 169,654, filed October 18, 1937, proposes a process for the separation of the major components of tall oil, namely, fatty acids and resin acids. Our present invention is concerned with the refining of tall oil and isolating and recovering therefrom two components occurring in smaller quantities, namely (1) the coloring substances, and (2) phytosterol. By removing these constituents from tall oil we not only obtain valuable by-products, but also obtain a final refined tall oil product of improved color and odor. The main product or major constituent group obtained according to our present process can be further refined by our process disclosed in our co-pending application No. 169,656, filed October 18, 1937. The fatty and resin acids contained in the said main product can be separated by our novel process disclosed in our aplication No. 169,654.

It is obvious that the dark color of crude tall oil is a great handicap in some of the applications of tall oil in the arts, as for example in that of soap making. Removing the substances causing the intense dark color of tall oil improves the color to such an extent that the further refining to a light yellow oil can be accomplished by very simple means.

The coloring matter of tall oil is practically insoluble in hydrocarbon solvents, particularly petroleum fractions, even at higher temperatures. If crude tall oil is dissolved in a petroleum fraction, a voluminous, dark precipitate is formed which can be separated from the solution by filtration. We have found, however, that the solvent power of the fatty and resin acids present counteracts the tendency of the petroleum solvent to precipitate the coloring substances. Therefore, only a fraction of the petroleum insoluble matter is precipitated when tall oil is dissolved in a petroleum solvent. If, for example, tall oil is dissolved in its own volume of naphtha, and the precipitate removed by filtration, we obtain a clear solution. If this solution is diluted with the same solvent, it becomes cloudy, and on standing a further quantity of petroleum insoluble matter will precipitate. Even if tall oil is dissolved in several times its own volume of solvent, the precipitation is not complete. For this reason, dissolving tall oil in a petroleum solvent and filtering, as proposed by German Patent No. 424,031, is not a rational method for the separation of the petroleum insoluble coloring matter. The disadvantages of high dilution, involving the storing, handling and distilling of large quantities of solvent, are obvious.

We have also found that the same treatment which removes the coloring matter, also causes the separation of a very valuable component of tall oil, namely, phytosterol.

To carry out our process we prefer to dissolve tall oil in approximately its own volume of a hydrocarbon solvent, preferably a petroleum fraction of a narrow boiling range. We have discovered that on treating this solution with hydrochloric acid, the phytosterol and the petroleum insoluble coloring matter contained in tall oil are precipitated. The quantity of petroleum insoluble matter isolated from a tall oil solution after treatment with hydrochloric acid is always greater than the quantity obtained by precipitation with the petroleum solvent alone.

For example, if we dissolve a 500 gram specimen of tall oil derived from kraft black liquor resulting from coniferous woods of the southern part of the United States, in 500 cc. naphtha, and remove the petroleum insoluble portion by filtration, we obtain 1.7 grams of coloring matter. If the clear filtrate is now treated with hydrochloric acid, a precipitate is obtained from which an additional quantity of 3.4 grams of coloring matter can be isolated. Or, if 500 grams of tall oil dissolved in 500 cc. of naphtha, are treated, without previous filtration, with hydrochloric acid, we obtain a precipitate which besides the phytosterol contains 5.0 grams of petroleum insoluble coloring matter.

Phytosterol is soluble in tall oil, and also remains in solution when tall oil is dissolved in a petroleum solvent. On treating tall oil or its solution with hydrochloric acid, however, the phytosterol is precipitated. We do not suggest a chemical mechanism for this transformation of phytosterol into an insoluble form. From the standpoint of our invention it is immaterial whether for example there is formed a phytosterol-hydrochloric acid addition compound, or whether the phytosterol is isomerized by the hydrochloric acid to a less soluble modification, or whether the solvent power of the medium has been changed by the addition of hydrochloric acid, and therefore by the use of the term "phytosterol" in the claims we do not necessarily mean phytosterol in the form as it originally occurs in the tall oil.

After the treatment with hydrochloric aicd, the tall oil solution which contains the precipitate in suspension or settled to the bottom of the vessel, is filtered by any available means, such as by vacuum, by pressure, or by centrifuging. We obtain on the filter a brown substance which is washed with a petroleum solvent, and then further treated to separate the coloring matter from phytosterol.

Our process also can be carried out by filtering the tall oil solution before treating with hydrochloric acid. However, due to the colloid nature of the precipitate formed on dissolving tall oil in a petroleum solvent, filtration is extremely tedious and much too slow for practical purposes. We prefer to effect the hydrochloric acid treatment without previous filtration of the petroleum-insoluble matter. We thereby not only eliminate one filtration but also obtain a precipitate which, due to the crystalline phytosterol-hydrochloric acid compound, is of a granular nature and easily filtered.

We have found that if we dispense with a solvent and treat crude tall oil itself with hydrochloric acid, we obtain approximately the same quantity of precipitate which is obtained from a tall oil solution. Our process therefore is not necessarily based on the use of a solution of tall oil. However, the high viscosity of tall oil makes settling and filtration of the precipitate slow unless a small quantity of solvent is added to the tall oil previously treated with hydrochloric acid or the tall oil is kept somewhat above room temperature. We have found that dissolving the tall oil in a solvent speeds up the reaction with hydrochloric acid and all the subsequent operations. One half volume of solvent to one of tall oil gives a sufficiently dilute solution for rapid work. Our preferred proportion is about one volume of solvent to one of tall oil.

As a solvent we prefer hydrocarbon solvents. Aromatic solvents, such as benzol or toluol, chlorinated solvents as for instance carbon tetrachloride, or petroleum fractions, for instance naphtha, are suitable for our purpose. We prefer to use a petroleum fraction of a narrow boiling range.

For the hydrochloric acid treatment we use either concentrated hydrochloric acid or gaseous hydrochloric acid which is generated by one of the usual methods. The use of concentrated hydrochloric acid requires very thorough stirring in order to assure an intimate contact between the aqueous acids and the oil, and to cause the precipitation of the coloring matter and phytosterol to be nearly as quantitative as possible. The necessity of stirring is avoided when instead of concentrated hydrochloric acid we use gaseous hydrochloric acid which by absorption is easily distributed uniformly throughout the oil. We either bubble the gaseous acid through the tall oil, or contact the oil in counter current with hydrochloric acid in a tower, regulating the current of hydrochloric acid in such a manner that by the time the tall oil has reached the bottom of the tower, it has absorbed a sufficient quantity of hydrochloric acid to cause the precipitate to settle out. The use of gaseous hydrochloric acid has the further advantage that a considerable portion of the acid absorbed in the tall oil solution can be recovered by heating the tall oil solution after filtering off the precipitate. The quantity of gaseous hydrochloric acid required to cause the formation of a granular, easily filterable precipitate, is approximately one to two per cent by weight of the tall oil, or if the tall oil is dissolved in its own volume of solvent, approximately one-half to one per cent by weight of the solution is required. However, a lower or higher concentration of hydrochloric acid may be used.

We prefer to carry out our process near or below room temperature. A low temperature has the advantage of speeding up the absorption of hydrochloric acid, thereby reducing the time required for the separation of the precipitate.

The aforementioned precipitate collected on the filter, which is a brown substance, may then be washed with a small amount of solvent in order to remove the occluded liquid portion of tall oil. The separation of the coloring matter from the phytosterol is effected by extracting with a hydrocarbon solvent, which at higher temperatures dissolves the phytosterol but leaves the coloring matter undissolved. The phytosterol is then recovered from the hydrocarbon solution, and after crystallization in alcohol the phytosterol is obtained as a white crystalline compound of melting point 137° C. Instead of using a hydrocarbon solvent for the extraction of the precipitate, the latter can be dissolved directly in boiling alcohol and on cooling, phytosterol obtained in crystalline form. The crystals are purified by further crystallization.

Our process has been particularly applied to tall oil because this oil is especially rich in phytosterol. Our method of isolating phytosterol, however, can be applied to any commercially promising source containing phytosterol in the free, unesterified state, such as, for example, crude corn oil, crude soy bean oil, etc.

After the coloring matter and the phytosterol have been removed, the further refining of tall oil is greatly simplified. By the hydrochloric acid treatment alone we obtain a tall oil which is considerably lighter in color than the original. Thus after the hydrochloric acid treatment and removal of the solvent by distillation, a crude tall oil originally of a color 45 F. A. C., may be refined to give a product of color 23 F. A. C.

As a next step in our process we heat the filtered tall oil or tall oil solution in order to drive off most of the gaseous hydrochloric acid absorbed in the solution, and utilize the hydrochloric acid so recovered in the treatment of another batch of tall oil. Then we wash the tall oil with water, preferably at a higher temperature until the odor of hydrochloric acid disappears. This treatment further improves the color of the oil. If the oil at this stage is now treated with a sufficient amount, for instance 5 to 10 per cent, of fuller's earth, a product of satisfactory color for some purposes is obtained.

As a final step in our refining process we remove the solvent by distillation and obtain a viscous oil of yellow or light brown color and consisting essentially only of fatty acids, resin acids and whatever unsaponifiable matter remains after the removal of the phytosterol.

EXAMPLES

The following examples will illustrate our process as applied to certain specific specimens of tall oil, and therefore we do not wish to limit ourselves to the conditions as disclosed in these particular examples:

*Example I*

Two kilograms of tall oil are dissolved in 2 liters of naphtha and the solution cooled to 0° C. Gaseous hydrochloric acid is conducted into the cold solution until the increase in weight is about 20 grams. After standing over night the solution is filtered and the residue on the filter washed with 200 cc. cold alcohol. Thirty grams of crude phytosterol are obtained which on recrystallization in alcohol yield 20 grams of phytosterol M. P. 137° C.

*Example II*

Five hundred grams tall oil are dissolved in 500 cc. naphtha. Gaseous hydrochloric acid is bubbled through the solution which is kept at room temperature until the increase in weight is 12 grams. After standing two days the mixture is filtered and 24 grams precipitate obtained. The precipitate is washed with 50 cc. cold naphtha and the naphtha added to the filtrate. The washed precipitate is treated with 50 cc. boiling naphtha and the clear boiling naphtha solution poured off the insoluble coloring matter which lumps into one mass. The naphtha is evaporated and the residue crystallized in 90% alcohol. Seven and a half grams of phytosterol are obtained after the first crystallization, the yield of coloring matter being 5 grams.

The filtrate is first warmed under reflux to drive off the absorbed hydrochloric acid, and then refluxed 4 hours with water, separated from the water and treated with 50 grams fuller's earth. Distillation of the naphtha leaves as residue a light colored oil which on standing deposits resin acid crystals.

It will therefore be seen that by our process we have effected a clean isolation and recovery of the petroleum-insoluble coloring matter, and we have made a precise separation and removal of phytosterol. We have furthermore improved residual color and eliminated a portion of the unsaponifiable matter from the tall oil, and have produced a refined mixture of fatty and resin acids.

It will be understood that since the composition and source of the starting materials used in our process may vary, and especially since the composition of tall oil may vary with the kind of coniferous wood going to the kraft digestors, its geographical source, the season of the year, or the slight differences in the "cook" liquor, or digestion conditions from batch to batch, or mill to mill, we do not wish to be restricted to the examples herein set forth, or to the exact conditions or details of carrying out our process as herein set forth, except as limited by the appended claims.

We claim as our invention:

1. A process of obtaining valuable products from tall oil which comprises subjecting crude tall oil to refining treatment at a temperature near or below atmospheric with approximately 1 to 2% of hydrogen chloride by weight of the tall oil to form a granular readily filterable precipitate, filtering off the resultant precipitate and treating it with alcohol to selectively dissolve and separate coloring impurities from phytosterol contained therein, separating the solvent solution and treating the undissolved material to recover therefrom by crystallization purified phytosterol as a product of the process.

2. A process of obtaining valuable products from tall oil which comprises subjecting crude tall oil to refining treatment at a temperature near or below atmospheric with approximately 1 to 2 percent of gaseous hydrochloric acid by weight of the tall oil, filtering off the resulting precipitate and treating it with cold alcohol to dissolve coloring impurities but not phytosterol contained therein, separating the solvent solution and treating the undissolved material with boiling alcohol to recover therefrom by crystallization purified phytosterol as a product of the process.

3. A process of obtaining valuable products from tall oil which comprises subjecting crude tall oil to refining treatment at a temperature near or below atmospheric with approximately 1 to 2% of hydrogen chloride by weight of the tall oil to form a granular readily filterable precipitate, filtering off the resultant precipitate and treating it with alcohol to selectively dissolve and separate coloring impurities from phytosterol contained therein, and recovering purified phytosterol as a product of the process.

4. A process of obtaining valuable products from tall oil which comprises subjecting crude tall oil in an organic solvent to refining treatment at a temperature near or below atmospheric with approximately 1 to 2% of hydrogen chloride by weight of the tall oil to form a granular readily filterable precipitate comprising essentially the coloring impurities and phytosterol content of the oil, treating it with alcohol to selectively dissolve and separate the coloring impurities from the phytosterol, and recovering purified phytosterol as a product of the process.

5. A process of obtaining valuable products from tall oil which comprises subjecting crude tall oil to refining treatment at a temperature near or below atmospheric with approximately 1 to 2% of hydrogen chloride by weight of the tall oil to form a granular readily filterable precipitate comprising essentially the coloring impurity and phytosterol content of the oil, filtering off the resultant precipitate and treating it with boiling alcohol, cooling the resultant solution and recovering therefrom by crystallization purified phytosterol as a product of the process.

FREDERICK H. GAYER.
CHARLES E. FAWKES.